United States Patent [19]
Barker et al.

[11] Patent Number: 6,021,360
[45] Date of Patent: Feb. 1, 2000

[54] PROCESS CONTROLLER FOR BALANCING USAGE OF TOOL SETS

[75] Inventors: Brian C. Barker, Poughkeepsie; John T. Federico, Wappingers Falls; George R. Goth, Poughkeepsie; Perry G. Hartswick, Millbrook, all of N.Y.

[73] Assignee: International Business Machines Corporation, Armonk, N.Y.

[21] Appl. No.: 08/963,943

[22] Filed: Nov. 4, 1997

[51] Int. Cl.[7] .................................................. G06F 19/00
[52] U.S. Cl. ................................... 700/174; 702/34
[58] Field of Search .................. 364/468.01, 474.15, 364/474.17; 702/33, 34; 73/104, 862.193

[56] References Cited

U.S. PATENT DOCUMENTS

| | | | |
|---|---|---|---|
| 4,208,718 | 6/1980 | Chung | 364/474.15 |
| 4,351,029 | 9/1982 | Maxey et al. | 702/34 |
| 4,442,494 | 4/1984 | Fromson et al. | 702/34 |
| 4,456,960 | 6/1984 | Wakai | 364/474.17 |
| 4,471,444 | 9/1984 | Yee et al. | 364/474.17 |
| 4,497,029 | 1/1985 | Kiyokawa | 364/474.17 |
| 5,244,447 | 9/1993 | Tanaka et al. | 438/1 |
| 5,485,391 | 1/1996 | Lindstrom | 364/474.17 |
| 5,587,931 | 12/1996 | Jones et al. | 702/34 |
| 5,602,347 | 2/1997 | Matsubara et al. | 73/862.193 |
| 5,689,062 | 11/1997 | Jawahir et al. | 73/104 |
| 5,819,202 | 10/1998 | Sato et al. | 702/33 |

*Primary Examiner*—William Grant
*Assistant Examiner*—Chad Rapp
*Attorney, Agent, or Firm*—Whitham, Curtis & Whitham; Jay H. Anderson

[57] ABSTRACT

A system monitors usage of a tool in a tool set and warns an operator and/or prevents usage of a tool chosen by an operator, subject to possible override by the operator, if permitted, in order to balance usage among tools of the tool set and verify operational conditions of tools of the tool set through usage. The system and method are entirely transparent to the operator and the operator is permitted full flexibility of tool choice unless tool usage becomes unbalanced. The system and method preferably limits usage based on length of consecutive usage and percentage of product processed by each tool. Use of new, modified or repaired tools is also prevented until the tool is certified for a particular process and defined to the system.

19 Claims, 2 Drawing Sheets

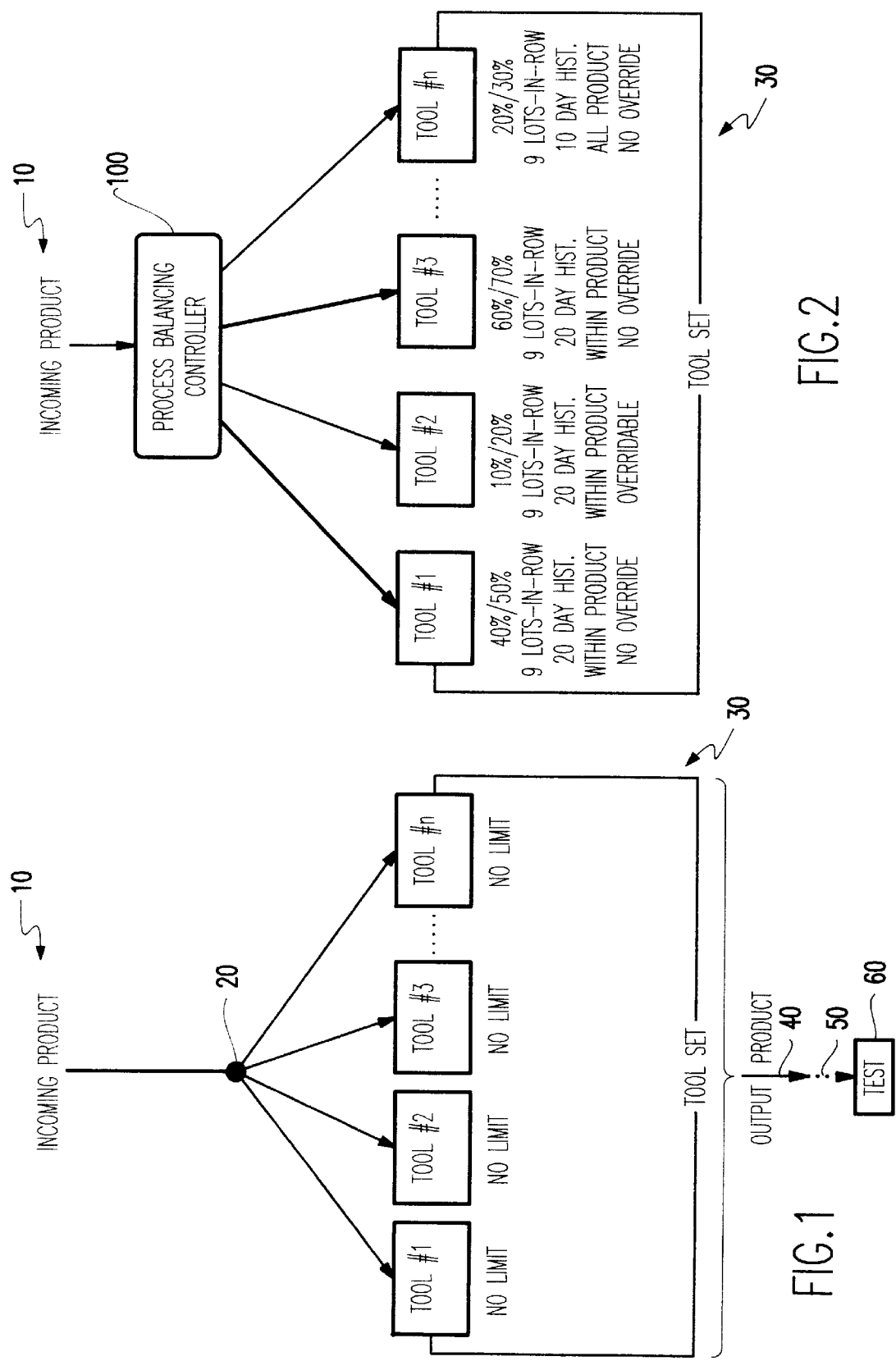

PROCESS CONTROLLER FOR BALANCING USAGE OF TOOL SETS

BACKGROUND OF THE INVENTION

1. Field of the Invention

The present invention generally relates to physical processes such as manufacturing processes for which tools are used and, more particularly, to operator-supervised automated processes for which a plurality of suitable tools may be concurrently available such as lithography or other semiconductor manufacturing processes.

2. Description of the Prior Art

Many physical processes such as those used in manufacturing require the use of tools in order to accomplish the desired result. Often, the tools are specially designed and constructed or adapted for particular processes. Lithographic exposure tools and plasma reactor vessels (either of which may be of any one of many different designs, capacities, efficiencies and the like) are examples of expensive, special-purpose tools used for semiconductor manufacturing processes. However, it is to be understood that many other examples of physical processes and tools for performing them exist and may be of substantially greater or lesser cost and complexity. Box-end and open-end wrenches (which could be used interchangeably for most purposes of assembly of machinery) would be an extremely simple example of tools of different design which might be used for a given process.

Whether the process or the tool is simple or highly complex, there is a tendency for the same tool to be repeatedly used to carry out a given process. In a simple case, an artisan may be likely to choose a tool which most recently provided satisfactory results or a tool with which the artisan is most experienced and comfortable. Likewise, an artisan may choose a tool which is, correctly or incorrectly, thought to be in the best condition even though the condition of the tool may tend to deteriorate during use, such as a tool having a blade for woodworking.

The same is true for complex, automated processes which are supervised by a human operator. For example, if tools having different throughputs are available, an operator is likely to choose the one having the greater throughput and to continue use of the same tool thereafter. Even among a plurality of tools of identical design and specification, the tool of choice is likely to be that which most recently was satisfactorily used.

In critical manufacturing processes, such as those involved in semiconductor integrated circuit manufacture, however, such a tendency to repeatedly choose the same tool for repeated use may have undesired consequences. For example, a need to adjust, calibrate, repair or rework a tool may only become evident after numerous other processes have been completed and/or the process carried out for a relatively large number of wafers in one or more production runs. Further, an unsuitable condition of a tool may not be evident or even easily determinable except through use and, while it may appear that several interchangeable tools are available, a given tool may not, in fact; be in satisfactory condition or a substituted tool may not provide satisfactory results or results that are complementary to or compatible with other processes within a manufacturing line.

At the same time, however, it is desirable in critical manufacturing processes such as semiconductor manufacturing, to maintain as high a degree of consistency as possible to minimize variation in the final product. It is not possible, even on identical tools, to exactly maintain all processing parameters unchanged. (Even though process variation can be quite small on a given tool, process variation can occur for different locations within the tool in a single process such as between wafers concurrently processed using the tool or even across a single wafer. For example, astigmatism across the field of a lithographic exposure tool can compromise otherwise identical exposures made in a step-and-repeat fashion. Similarly, wafer chucks must be carefully designed to limit temperature variation across a wafer to minimize variation in growth, deposition or etch rates.)

Such variation in process parameters, even on a single tool, may use a significant portion of the so-called "process window" for a given process and closely matching performance on a different tool is often obtained only with difficulty. Therefore, while there are advantages in manufacturing yield and product consistency through consistent use of a particular tool, a change of condition of the tool may severely compromise a large segment of a production run if unsuitable operating conditions are not detected in a timely fashion and if one specific tool is used for all devices in a production run, a set of jobs or lots, or an entire manufacturing line since a replacement tool may not, as a practical matter, be available to substitute for another tool taken out of service.

Additionally, the substitution of one tool for another in a production line may carry economic costs such as the time necessary to implement the substitution, change of throughput and the like while the condition of any tool may only be determinable through at least periodic use. Therefore, significant practical trade-offs exist between consistent use of a particular tool and use of a plurality of tools in sequence or alternation to carry out a process.

Another consideration alluded to above is the service requirements or usable lifetime of any particular tool or part thereof. Usually, the number of hours of use or the number of times a process can be performed prior to a need arising for maintenance or service of the tool can be projected with adequate accuracy to maintain overall efficiency and avoid down-time of the production line. However, the number of processes which can be carried out between maintenance operations can be strongly affected by both the nature of the process performed and the process parameter tolerances within the product. That is, how much process parameter variation attributable to use of the tool can be tolerated before manufacturing yield is compromised.

Tool performance can also be degraded by either frequency of use or period of non-use and any change in performance with use must be considered against the cost of establishing necessary conditions of the tool, such as bringing a reactor vessel to the proper temperature. The impact of a need for tool maintenance will also vary with the circumstances of the production line (e.g. the economic cost of stopping a production line for the period of maintenance or to substitute another tool).

Finally, when a tool or tool set is placed back into service, the only way to verify the success or failure of any changes made to the tool is to utilize the tool in production. Although resulting variations in product are thus unavoidable, every effort must be made to keep the entire product set from flowing through the tool in question until a final product certification can be completed.

Currently, there is no systematic methodology for relating tool use, process condition change with tool usage pattern and tool maintenance with product requirements. Moreover, merely alternating or sequencing use of tools in a tool set (e.g. a group of tools suitable to a particular process) is often inconsistent with efficiency and high levels of productivity. Further, for complex processes such as in semiconductor manufacturing where the design of the product is strongly dependent on tool capability, new designs of tools are being consistently produced to improve process accuracy, throughput and the like. However, such tools must be qualified as suitable for a given process before they are placed in a manufacturing line. At the same time, such tools are often installed proximate to a manufacturing line to be used experimentally and for developing calibration and other aspects of use before being used to produce product which may be sold but could be placed on-line at the will of an operator. Currently, there is no procedure for preventing an operator from placing an unqualified tool in a manufacturing line.

However, an operator is responsible for the productivity of a manufacturing line which includes one or more tools, such as those described above. Therefore, productivity should be of paramount importance and consideration of tool condition or balancing of tool use may be a significant distraction. The operator must have the flexibility to choose among functional and qualified tools to maintain production volume of high-quality product. At the same time, tool condition and balancing of tool use must be considered to maintain manufacturing yield and to insure the integrity of the tools in the manufacturing line, including the availability of replacement tools, when needed, to avoid lengthy downtime of the manufacturing line.

SUMMARY OF THE INVENTION

It is therefore an object of the present invention to provide a system and methodology which allows flexibility of tool choice to an operator while monitoring tool usage and ensuring balanced usage of tools in a tool set.

It is another object of the invention to provide a system and methodology for maintaining production of a volume of high-quality product notwithstanding undetected unsuitable conditions or failure of a tool in a tool set within a manufacturing line.

It is a further object of the invention to provide a system and methodology for ensuring that no tool in a tool set will be used to produce more than a limited percentage of a production run or a series of continuous runs.

It is yet another object of the invention to provide a system which will assure functionality of tools in a tool set through periodic usage of each tool in combination with monitoring of the quality of the product of processes performed by each tool of the tool set.

In order to accomplish these and other objects of the invention, a method of controlling processing for a tool set within a manufacturing line is provided including the steps of retrieving tool and process usage data and tool-specific data based on a chosen tool and process history, calculating a production parameter from the tool and process usage data, comparing the production parameter to a limit, and selectively permitting or preventing use of the chosen tool based on results of the comparison.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a high-level flow diagram illustrating the problem addressed by the invention, FIG. 2 is a high-level flow diagram similar to FIG. 1 illustrating an exemplary implementation of the invention.

DETAILED DESCRIPTION OF A PREFERRED EMBODIMENT OF THE INVENTION

Figure 3:
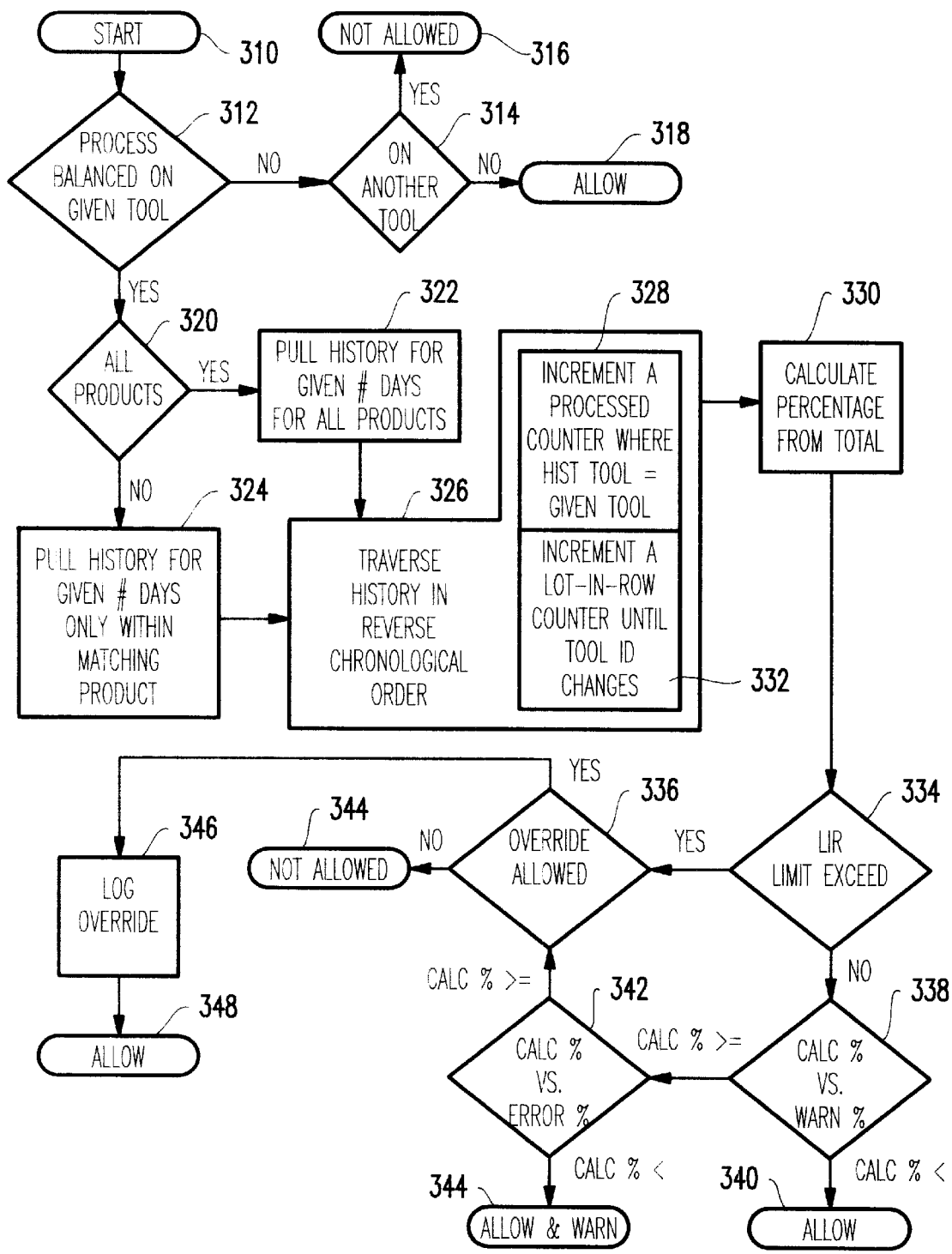
FIG. 3 is a flow diagram or schematic illustrating the preferred system and methodology of the invention.

Referring now to the drawings, and more particularly to FIG. 1, there is shown a high-level diagram illustrating the problem addressed by the invention as outlined above for an arbitrary process for which a tool of a tool set may be used. A "process", as used hereinafter, will connote a single operation co-extensive with an instance of the use of a particular tool in the course of manufacturing. For example, in regard to semiconductor manufacturing, etching would be a single process while masking would, say, comprise the processes of application of resist, exposure of the resist and development of the resist, each of which would require a different tool.

Tools of a tool set are assumed to be equivalent and fungible in effectiveness for the particular process to be carried out but may differ in design and such parameters as speed of operation, throughput, capacity, maintenance interval and the like. Respective tools of a tool set may have differing capabilities in regard to other processes, such as a reactor vessel which could be used for either material deposition, growth or etching. The entirety of FIG. 1 (or FIG. 2) should be understood as representing an arbitrary, singular stage of manufacture of an arbitrary product. It is also assumed, for purposes of conveying an understanding of the effects of the invention, that the realization of the desired result of the process can only be determined by testing of the product after the process is complete.

As illustrated in FIG. 1, incoming product 10 represents, for example, an object at an initial or intermediate stage of manufacture to be subjected to a process carried out on one of tool #1–tool #n of tool set 30. The choice of the tool to be used in the process is made by an operator symbolically represented by node 20 from which the process branches to a particular tool. The output product of any tool is represented by arrow 40 and should ideally be the same regardless of the tool which produces it.

In the absence of a system or methodology such as that provided by the invention, as will be described below, any tool may be freely chosen by the operator without qualification or limitation as indicated by the legend "no limit". As discussed above, while the tools of tool set 30 may be entirely equivalent in regard to the particular process being conducted, they may differ in some ways such as throughput, ease of use or the like which is very likely to cause one particular tool to be chosen to the virtual exclusion of others. Even among identical tools, the tool most recently used with success will generally be the tool chosen for subsequent repetitions of the process.

Repeated choice of the same tool, for example, tool #1, thus excludes use of tool #2–tool #n. If correct function cannot be determined until completion of the process, the cost of carrying out the process (and, generally, all prior processes previously performed on the incoming product in earlier portions of the manufacturing line) will be lost if the tool does not function correctly. In practice, particularly in semiconductor manufacturing, testing 60 will not be done until a number of additional processes have been completed, as indicated by dotted arrow 50. During the time required for the additional processes, it is also likely that the same tool will have been used numerous further times on other incoming product 10.

Thus incorrect function of a tool may cause loss of the cost of numerous repetitions of the process as well as the cost of all intervening (and prior) processes on all incoming product prior to testing. Moreover, it can be understood that the proportion of the production run for which the same tool is used will be comprised by the incorrect function of the tool. That proportion of a production run can be very large if the same tool is predominantly used.

Of similar importance, the condition of other tools of the tool set cannot (under the above assumptions) be evaluated without use. If a tool which is regularly chosen for use is found to be performing incorrectly, another tool must be substituted as quickly as possible to minimize loss of production of the entire manufacturing line. If the functionality of another tool is not established at the time a substitution is needed, the time required for substitution will be extended by the time necessary to verify operability of the substituted tool.

Referring now to FIG. 2, the overall function of the invention will now be discussed. In FIG. 2, incoming product 10 and tool set 30 are the same as in FIG. 1, as are the output product 40, additional processes 50 and testing 60; depiction of which is omitted in the interest of clarity. Essentially, the invention 100 is an aid to the user (depicted at node 20 of FIG. 1) for monitoring tool use, maintaining information regarding each available tool as to both specifications and tool and process use history, assisting in the choice of tool and warning the operator or preventing use of a particular tool to balance the use of tools of a tool set.

Exemplary information concerning each tool is depicted in FIG. 2. It should be understood that the categories of information maintained are arbitrary in regard to the principles of the invention but the information depicted is preferred for the preferred application of the invention to a semiconductor manufacturing line. (In this regard, it should be appreciated that numerous processes, often numbering in the hundreds, are involved in the manufacture of an integrated circuit and the invention may be applied in the manner depicted to any or all individual processes involved. Features of the invention which will be discussed below facilitate the simultaneous application of the invention to an arbitrary number of selected processes.)

For example, two percentages are depicted in the first line of the information list for each tool. These percentages represent warning and control/error levels, respectively, for the maximum percentages of product over a specified time frame which is allowed to be processed using the associated tool. These percentages are preferably set in consideration of tool capacity, throughput and the like as well as maximum tolerable losses in view of particular production schedules.

The second line sets a limit on the number of lots of product which are permitted to be produced consecutively ("lots-in-a-row" or "LIR") on the associated machine. This parameter essentially sets the maximum duration of continual use or consecutive uses of a particular tool.

The third line contains a history of the results of use of the tool over a length of time which is arbitrary but advantageously limited in accordance with the nature of the tool and the criticality of its condition to allow discarding of information which has a low probability of being substantively relevant to the current condition of the tool. On the other hand, the historical data should be maintained over a period long enough to exceed the longest period of time that use of a particular tool is permitted (for example, so that the number of lots-in-a-row will not be truncated at a number lower than the allowed number). The first through third lines of data in this example or other desired information on which tool usage control may be based may be used to compute one or more production parameters or to set limits on tool usage, as may be desired.

The fourth line contains a parameter indicating the products for which the tool is qualified to perform a particular process (again to limit the data which is maintained and considered in the operation of the invention). In semiconductor manufacturing, in particular, some tools may be of general applicability but may be designed to permit being set up to perform very specialized functions. Such set up procedures may be very critical and this parameter should be set in consideration of whether the tool is arranged for specialized or general purpose processing as well as its qualification for the particular process and product.

The fifth line is a parameter which specifies whether or not the operator will be allowed to override the function of the invention which is generally determined on the basis of historical and empirical information concerning the tool and the criticality of the process and/or the process variability tolerances thereof to the successful manufacture of the process. For example, tailoring of a gate insulator thickness would be far more critical than application of a wiring pattern and overriding the function of the invention would generally be permitted in the latter but not in the former.

The use of this information to derive the meritorious effects of the invention will now be discussed with reference to FIG. 3. It should be understood that the invention is preferably implemented by suitable software programming of a general purpose digital computer and that FIG. 3 represents a flow diagram of the processes to be performed responsive to such software programming. Special purpose data processors or hardware could be used to practice the invention and FIG. 3 can also be understood as a block diagram of such special purpose processor or hardware. Even if a general purpose processor is employed, hardware resources of the general purpose processor will be allocated by the software to provide the functions illustrated.

The methodology of the invention is preferably initiated, as indicated at 310 of FIG. 3, for each process step. At this point the operator will specify a preferred tool for the process step. It is generally preferred to apply the invention only to the key processes in the manufacturing method. However, the key processes are readily defined in the design of the manufacturing process, itself, including a definition of the tool set with which each step may be performed and whether or not the process is to be balanced across the tool set. A determination of whether or not the invention is to be applied to that process step is made at 312 relative to a tool which the operator has chosen.

If the process is not intended to be balanced for a tool within a tool set, the process branches to 314 to determine if the process is intended to be balanced in regard to another tool or tool set. That is, an attempt is made at 312 to retrieve balancing limits for the process at a given tool. If the process/tool is not defined to the system and balancing limits are therefore not available, it is necessary to determine if the process is, in fact, balanced by determining if it is balanced on another tool at 314. If it is balanced on at least one other tool, then the process is a key process intended to be carried out in a balanced fashion and the tool selected by the operator is in error and use of the tool is not permitted, as indicated at 316.

Otherwise, the process is determined not to be a key process since balancing is not specified and the operator's choice of a tool is allowed, as indicated at 318. It should be noted that the process to this point is entirely transparent to the operator unless intervention in the operator's choice of a tool is required by the combination of a key process and a choice of a tool for that process for which balancing (and the process of the invention) is not defined. If the process is not a key process, the user is given full latitude of tool choice without the intervention of the invention.

If the process is to be balanced and the chosen tool is in the specified tool set, the process continues at 320 where a determination is made of whether or not the process is to be balanced for all products. This step causes branching to one of steps 322 and 324 to limit retrieved data to that which is relevant to the product being processed (e.g. all products, as indicated at 322, or only the matching product, as indicated at 324). Responsive to one of these steps, the relevant historical tool and process data and tool-specific (e.g. control limit) data is retrieved and the tool and process data is traversed in reverse chronological order as indicated at 326. The information accessed generally conforms to the information list discussed above in regard to FIG. 2 but could include any desired information such as manufacturing yield for prior uses as might indicate a need for repair or maintenance or an unfavorable comparison with other tools which might be chosen. It should be noted that traversal in reverse chronological order is done relative to the particular product or all products, as may be determined at 320, as discussed above and need only be continued for a relevant period such as twenty days over which reliability of the tool has been empirically established or, in the case of the LIR history, until the identity of the tool which most recently was used differs from the chosen tool. For example, LIR is zero if the most recently used tool is different from the tool in question (e.g. the operator has chosen a different tool).

From the historical data accessed, the number of units, lots or batches processed is retrieved for the chosen tool and incremented as indicated at 328. A percentage of the production run or set of lots or jobs previously produced by that tool is calculated as shown at 330. This combination of steps projects whether choice of the tool will result in the total percentage of the production run allowed for the tool being exceeded. Concurrently, the number of consecutive lots processed by the tool is similarly incremented as shown at 332. As alluded to above, this procedure endeavors to avoid adverse economic impact of the invention for tools where there may be a significant economic cost of establishing operating conditions such as bringing the tool to an elevated temperature, purging reactants to a low concentration and the like by balancing those costs against the possibility that undesired conditions may develop in the course of repeated use.

The number of consecutive lots processed (lots-in-a-row: LIR) is evaluated against a limit retrieved with historical tool and process and tool-specific data as shown at 334. If the LIR limit (at which control would be exercised to disallow use of the chosen tool subject to possible override) is exceeded, the percentage of production need not be evaluated and the process proceeds directly to determination if an override is allowed at 336.

If override is not allowed, use of the tool is not allowed, as illustrated at 344 and the operator is so informed so that another tool can be chosen. If an override is allowed, the override is logged at 346 and the use of the tool is allowed as indicated at 348. It should be noted that when allowance of the use of the chosen tool occurs the historical data is updated and re-stored to memory, either before or after completion of the process, as may be deemed preferable. The logging of the override may, for example, be used to alter the "override" parameter of the historical or tool-specific data to limit the number of overrides which are permitted. If an override is not permitted (at the time of the choice of the tool) the operator is preferably notified.

If the LIR limit is not exceeded, the calculated percentage of production is tested (at 338) against a lower percentage value of total production (e.g. 60% for tool #3 in FIG. 2) which serves as a warning level to the operator. If that percentage has not yet been reached (or would not be reached by current use of the tool then chosen), use of the tool is allowed as illustrated at 340. If the warning level has been reached, the calculate percentage of production is tested against the higher error/control percentage of production (e.g. 70% for tool #3 of FIG. 2) at 342. If the error/control percentage specification is not exceeded, a warning is issued to the operator in any desired manner (e.g. display, annunciator or the like) and use of the tool is allowed as indicated at 344. Of course, the operator is preferably provided with the option to substitute another tool in response to the warning.

In this regard, issuance of warnings for a number of tools of the tool set may be expected near the end of a production run such as a set of jobs or lots and the operator may wish, based on scheduling requirements or other concerns, to use another tool while reserving a potential allowable use of the chosen tool for later in the production run. In this case, the invention provides potentially valuable advice to the operator while allowing free choice of tools within established limits among tools of the tool set.

If the error/control limit is exceeded according to the history data the use of the tool, as determined at 342, the process branches to 336 at which the availability of an override is evaluated as discussed above. Again, the operator may choose to override a specified limit on usage of the tool based on other information at his disposal which may not and generally need not be processed and/or evaluated in accordance with the principles of the invention. As a perfecting feature of the invention, however, it should be understood that production, manufacturing yield and other statistics can also be tracked and presented to the operator as an incident of step 336 to assist in determination of whether or not the operator should specify an override, if allowed.

Returning briefly to FIG. 2, an exemplary sequence of operation of the invention will be described. It is assumed for purposes of this example that in a particular production run tool #1 has been used for 10% of the production run, tool #2 has been used for 20% of the production run, tool #3 has been used for 65% of the production run and tool #n has been used for 5% of the production run. The most recent consecutive run of lots was processed on tool #n at a count of nine lots within the past ten days.

When the next job arrives at the controller, following the procedure illustrated in FIG. 3, the invention will allow the job to be processed on tool #1 since the percentage production is well below the warning level and (since it differs from tool #n) the number of lots-in-a-row is zero. The invention will allow the job to be processed on tool #2 but only on condition that an override is specified by the operator since the percentage of production is currently at the error/control percentage (20%). The invention will allow the job to be processed on tool #3, as well but a warning will be issued (since the percentage of production exceeds the warning level but not the error/control level). The invention will not allow the job to be processed on tool #n (since the number of lots-in-a-row would be exceeded and no override is allowed). Accordingly, the operator would be so informed and prompted to choose another tool.

In view of the foregoing, it is seen that the invention provides a system for monitoring tool use and controlling balancing of tool use within broad specified parameters while remaining transparent to the operator unless an error is detected or a warning level exceeded, whereupon useful guidance and information is provided to the operator to assist in the choice of an alternate tool. By so doing, operable condition of tools of a tool set may be monitored and maintained while the integrity of a production run and volume of certifiable product may be assured and the meeting of production schedules is facilitated.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of controlling processing for a tool set within a manufacturing line, said method including the steps of
retrieving tool and process usage data and tool-specific data based on a chosen tool and process history of said chosen tool, and said process history being based on at least a period of reliability of said chosen tool,
calculating a production parameter from said tool and process usage data,
comparing said production parameter to a limit included in said tool-specific data including said process history of said chosen tool, and
selectively permitting or preventing use of said chosen tool in accordance with a result of said comparing step,
wherein said process history of said tool and process data are limited in accordance with a matching product.

2. A method as recited in claim 1, wherein said calculating step includes calculating a plurality of parameters and said comparing step compares each of said plurality of parameters against a respective limit.

3. A method as recited in claim 1, including the further step of
selectively allowing or preventing override of said step of selectively permitting or preventing use of said chosen tool.

4. A method as recited in claim 3, including the further step of logging said override when permitted and selected by an operator.

5. A method as recited in claim 4, including the further step of
altering and storing said tool specific data.

6. A method as recited in claim 1, wherein said step of calculating a production parameter includes the step of
traversing said historical tool and process data in reverse chronological order until a usage of a different tool is found.

7. A method as recited in claim 6, including the further step of
counting consecutive lots of product processed by the tool.

8. A method as recited in claim 7, wherein said step of calculating a production parameter includes the step of
calculating a percentage of total product which has been processed by a tool.

9. A method as recited in claim 1, wherein said step of calculating a production parameter includes the step of
calculating a percentage of total product which has been processed by a tool.

10. A method as recited in claim 1, including the further step of
retrieving tool-specific data for another tool when a chosen tool for a process is not defined, and
preventing use of a chosen tool if the process is defined for said another tool.

11. A method as recited in claim 1, wherein said tool-specific data includes a warning limit and an error/control limit.

12. A method of as recited in claim 11, further including calculating a percentage of total product which has been processed by a tool.

13. A method of as recited in claim 12, further comprising
comparing said percentage of total product to said warning limit, and
permitting use of the tool when said percentage of total product is less than said warning limit.

14. A method of as recited in claim 12, further comprising
comparing said percentage of total product to said warning limit,
comparing said percentage of total product to said error/control limit when said percentage of total product equals or exceeds said warning limit, and
preventing use of the tool when said percentage of total product exceeds or equals said error/control limit.

15. A method of as recited in claim 11, wherein said preventing use of the tool is selectively overridden such that the tool is permitted to be used.

16. A method of controlling processing for a tool set within a manufacturing line, said method including the steps of
retrieving tool and process usage data and tool-specific data based on a chosen tool and process history of said chosen tool, and said process history being based on at least a period of reliability of said chosen tool,
calculating a production parameter from said tool and process usage data, wherein said production parameter includes traversing said process history of said tool and process data in reverse chronological order until a usage of a different tool is found,
comparing said production parameter to a limit included in said tool-specific data including said process history of said chosen tool, and
selectively permitting or preventing use of said chosen tool in accordance with a result of said comparing step.

17. A method of controlling processing for a tool set within a manufacturing line, said method including the steps of
retrieving tool and process usage data and tool-specific data based on a chosen tool and process history of said chosen tool, and said process history being based on at least a period of reliability of said chosen tool,
calculating a production parameter from said tool and process usage data,
comparing said production parameter to a limit included in said tool-specific data including said process history of said chosen tool,
selectively permitting or preventing use of said chosen tool in accordance with a result of said comparing step, and
counting consecutive lots of product processed by the tool.

18. A method as recited in claim 17, wherein said step of calculating a production parameter includes the step of calculating a percentage of total product which has been processed by a tool.

19. A method as recited in claim 17, including the further step of retrieving tool-specific data for another tool when a chosen tool for a process is not defined, and preventing use of a chosen tool if the process is defined for said another tool.

* * * * *